US012636956B2

(12) United States Patent
    Hackl et al.

(10) Patent No.: US 12,636,956 B2
(45) Date of Patent: May 26, 2026

(54) METHODS AND ELECTRIC CIRCUIT ARRANGEMENTS FOR PROTECTION OF METALLIC COMPONENTS FROM CORROSION VIA STRAY CURRENTS

(71) Applicant: Bender GmbH & Co. KG, Gruenberg (DE)

(72) Inventors: Dieter Hackl, Fernwald (DE); Karl Schepp, Reiskirchen (DE)

(73) Assignee: Bender GmbH & Co. KG, Gruenberg (DE)

( * ) Notice: Subject to any disclaimer, the term of this patent is extended or adjusted under 35 U.S.C. 154(b) by 666 days.

(21) Appl. No.: 18/097,821

(22) Filed: Jan. 17, 2023

(65) Prior Publication Data

US 2023/0249555 A1      Aug. 10, 2023

(30) Foreign Application Priority Data

Jan. 18, 2022    (DE) .................... 10 2022 101 022.8

(51) Int. Cl.
    *B60L 3/00*        (2019.01)
    *B60L 3/04*        (2006.01)
        (Continued)

(52) U.S. Cl.
    CPC .............. *B60L 3/0069* (2013.01); *B60L 3/04* (2013.01); *B60L 53/22* (2019.02); *C23F 13/00* (2013.01);
        (Continued)

(58) Field of Classification Search
    CPC .... B60L 3/00; B60L 3/04; B60L 53/22; B60L 3/0069; B60L 53/11; H02H 3/04;
        (Continued)

(56)            References Cited

U.S. PATENT DOCUMENTS 5,310,470 A  *  5/1994  Agarwala  .............. G01N 17/02
                                                     324/700
10,333,318 B2    6/2019  Flack
                    (Continued)

FOREIGN PATENT DOCUMENTS

DE        102012200660 A1    5/2013
DE        102014217928 A1    3/2016
                    (Continued)

*Primary Examiner* — Danny Nguyen
(74) *Attorney, Agent, or Firm* — Dickinson Wright PLLC; Andrew D. Dorisio

(57)            ABSTRACT

Methods and electric circuit arrangements for protecting metallic components in an electrolytic medium from corrosion due to direct-current (DC) stray current (Is) from a power supply system. The DC stray current may be jointly registered as a total sum current across all active conductors together with the protective conductor of the power supply system by a DC total differential-current sensor. Alternatively, a combined DC differential-current sensor is switchable by a switching device, a differential current being registered across all active conductors or the DC stray current being registered as a total differential current across all active conductors and the protective conductor. Alternatively, a differential current may be registered across all active conductors by a DC current sensor at the protective conductor and the DC stray current computed by forming differences of the differential current registered by the differential-current transformer and of the protective conductor registered by the DC current sensor.

16 Claims, 4 Drawing Sheets

(51) Int. Cl.

| | |
|---|---|
| *B60L 53/22* | (2019.01) |
| *C23F 13/00* | (2006.01) |
| *H02H 3/04* | (2006.01) |
| *H02H 3/087* | (2006.01) |
| *B60L 53/10* | (2019.01) |

(52) U.S. Cl.
CPC .............. *H02H 3/04* (2013.01); *H02H 3/087* (2013.01); *B60L 53/11* (2019.02)

(58) Field of Classification Search
CPC ..... H02H 3/087; C23F 13/00; C23F 2213/11; C23F 13/02; G01R 31/52
USPC .......................................................... 361/42
See application file for complete search history.

(56) References Cited

U.S. PATENT DOCUMENTS

| | | | | |
|---|---|---|---|---|
| 2005/0259371 | A1 | 11/2005 | Henze | |
| 2014/0015487 | A1 | 1/2014 | Brown | |
| 2014/0347769 | A1 | 11/2014 | Kanda | |
| 2016/0033565 | A1* | 2/2016 | Reid | G01R 31/083 |
| | | | | 324/503 |
| 2016/0142217 | A1 | 5/2016 | Gardner | |
| 2016/0145517 | A1 | 5/2016 | Matteucci | |
| 2017/0255913 | A1 | 9/2017 | Stokman | |
| 2018/0056802 | A1 | 3/2018 | Martel | |
| 2020/0070677 | A1 | 3/2020 | Spesser | |
| 2020/0408850 | A1* | 12/2020 | Xu | G01R 31/085 |

FOREIGN PATENT DOCUMENTS

| | | | |
|---|---|---|---|
| EP | 0215620 | A3 | 5/1988 |
| JP | H1048282 | A | 2/1998 |

* cited by examiner

METHODS AND ELECTRIC CIRCUIT ARRANGEMENTS FOR PROTECTION OF METALLIC COMPONENTS FROM CORROSION VIA STRAY CURRENTS

This application claims priority to German Patent Application No. 10 2022 101 022.8 filed on Jan. 18, 2022, the disclosure of which is incorporated herein by reference.

TECHNICAL FIELD

The invention relates to methods and electric circuit arrangements for protection of metallic components in an electrolytic medium from corrosion as a consequence of a direct stray current (DC stray current) from a power supply system.

BACKGROUND

Unprotected metallic components, which are in an electrolytic environment, such as steel inserts in a concrete foundation or buried metallic devices, are exposed to corrosion via DC stray currents from the power supply system. In buildings made of ferroconcrete, the material erosion occurring at the reinforcing steel can lead to an attenuation of the statics or cause leaks in buried pipes.

Negative, in some cases even dangerously weakening influences on the statics of buildings are not caused by only DC stray currents in the ampere range, but by DC stray currents in as little a range as milliampere, if these DC stray currents flow continuously and mostly unnoticed over a longer period of time.

A suitable means for preventing DC stray currents directly at the power supply source of a power supply installation consists of installing a power supply system having an ungrounded network type (IT system; French: isolé terre) and ensuring a particularly high-impedance insulation resistance level to ground while also monitoring the insulation state via a standardized insulation monitoring device (IMD).

In applications which do not allow this and a grounded network type is used, requirements to taking into consideration and preventing corrosion via DC stray currents are made in standard DIN EN 50162 and different measures are suggested-such as using corrosion protection devices, corrosion-resistant materials or using coating methods for insulating a metallic conductor against the electrolytic environment.

Standard DIN EN 50162 makes reference to known applications for which negative effects with corrosion due to DC stray currents have been made, for example in rail traffic or in the electroplating industry.

Not taken into consideration or given too little consideration is the increasing prevalence of DC power supply systems particularly in the industrial field and in the field of charging-station infrastructure for electric vehicles (EV charging stations).

This gives rise to the question to how large an influence, viewed over a long period of time, the strongly growing number of electric vehicles will have, which are connected to a charging station in a parking facility, for example, and this charging station will dissipate DC stray currents up to 1 mA in size via the ferroconcrete foundation of the parking facility via aging and pollution effects. In this context, the DC fault-current circuits or DC leakage-current circuits, which lead across the closed protective conductor, are not observed, but electrically conductive current paths in the electrolytic building structure. Similar scenarios having negative effects on the building statics are to be taken into account for the increasing use of DC-powered machines, such as production robots.

Hitherto, the problem of corrosion of metallic components in an electrolytic medium via DC stray currents has been examined only with respect to the negative corrosive effects that DC stray currents have on the components in some applications. Hence, the recommendations of standard DIN EN 50162 are used in rail traffic or in the electroplating industry.

For installations possibly at risk to corrosion, it has hitherto been examined unsatisfactorily whether and at which magnitude DC stray currents from power supply plants pass into a surrounding electrolytic medium and cause corrosive effects there on the metallic components. In order to employ suitable protective measures against corrosion in a specific usage case, the metrological monitoring and assessment of DC stray currents is indispensable in critical installations.

Among the observed critical installations are, for example, those for which innovative electric equipment will be put on the market in large numbers in the future (for example, DC-supplied machines, in particular robots, in industrial installations) or for which it is conjectured that DC stray currents flow permanently and thus effectively into the building infrastructure after a degrading of the insulating section, making the danger of an attenuation of the building statics possible (example: EV charging stations in parking facilities).

SUMMARY

The object of the invention at hand is therefore to design a method and a device for protection of metallic components in an electrolytic environment from corrosion due to DC stray currents.

In a first alternative solution, the object is attained by the DC stray current being jointly registered as a total sum current across all active conductors together with the protective conductor of the power supply system by a DC total-differential-current sensor.

The fundamental idea of the invention at hand consists of installing DC differential-current monitoring as highly sensitive as possible in facilities at risk to corrosion which is capable of distinguishing and assessing a DC stray current from occurring fault currents and inevitably present leakage currents.

For measuring reasons, the indicative factor is the difference between the already available differential-current transformers (a residual-current device or a residual-current monitor (RCM)) for identifying fault and/or leakage currents flowing via the protective conductor on the one hand and the DC differential-current sensors installed according to the invention for identifying the DC stray currents flowing via the surrounding electrolytic medium on the other hand.

Even if a differential-current transformer is designed as a DC measuring-current transformer for identifying direct fault currents for ensuring the functioning of a type A (RCD) residual-current protective device and thus a 5 mA DC differential current can thus be determined by measurement, this does not mean that this registered 5 mA DC differential current is also a 5 mA DC stray current which leads to corrosion effects. If this 5 mA DC differential current actually flows exclusively into the central grounding point of the power supply installation via an insulated protective conductor and not via the electrolytic environment, no corrosive effects are to be expected.

The hitherto used differential-current measuring technology cannot distinguish between DC fault and/or leakage currents in the protective-conductor system designed in an insulated manner and DC stray currents in an electrolytic medium, since all current portions which do not flow via the active conductors are registered as differential currents by means of the differential-current transformers installed according to the state of the art, and thus the DC stray currents leaking via the electrolytic environment in addition to the DC fault and/or leakage currents.

The ideas described above equally pertain to the second and third alternative solution.

In the first alternative solution, an additional DC total differential-current sensor is employed according to the invention—in most cases in addition to a differential-current transformers already installed as a fault-current measure—with which a differential current is not exclusively measured via the active conductors, as is known from the state of the art and in contrast to common installation instructions, but is measured jointly across all active conductors and the protective conductor.

The DC total differential-current sensor thus registers only the DC stray current as the total differential current, the DC stray current leaking into the electrolytic medium and being suitable for causing corrosion in metallic components, e.g., the building infrastructure.

The dynamic range of the DC total differential-current sensor does not have to be configured for the DC fault and leakage currents expected to be much larger and can therefore finely resolve the DC stray currents expected to be particularly small.

In particular, the DC stray current is highly sensitive, having a resolution of less than 1 mA.

The DC total differential-current sensor can have a measuring range (dynamic range) limited in favor of a high resolution, since by involving the protective conductor in the total differential current, the fault/leakage currents much larger with respect to the DC stray current compensate themselves. The remaining total differential current corresponds to the DC stray current to be detected to which the shared DC total differential-current sensor can be adjusted with regards to the measuring range and the resolution. Thus, it is possible to also identify small DC stray currents having a size below 1 mA.

In the second alternative solution, the object is attained by a combined DC differential-current sensor being designed so as to be switchable by means of a switch device, a differential current being registered across all active conductors of the power supply installation in a first switch setting and the DC stray current being registered as a total differential current across all active conductors and the protective conductor of the power supply system in a second switch setting.

In this second alternative solution, only one, namely a combined, DC differential-current sensor is required which works according to the switch setting either functioning as a typical differential-current transformer employed according to the state the art and (only) comprises the active conductors of the power supply installation (first switch setting) or registering the total differential current across all active conductors and (also) the protective conductor of the power supply installation (second switch setting)—functioning as a DC total differential-current sensor as in the first alternative solution.

The dynamic range of the combined DC differential-current sensor must, in contrast to the DC total differential-current sensor described in the first alternative solution, however, also be designed for the DC fault and leakage currents expected to be much larger and can therefore identify the DC stray currents expected to be particularly small with only a slight resolution.

In the third alternative solution, the object is attained by registering a differential current across all active conductors of the power supply installation by means of a differential-current transformer, a protective-conductor current being registered by means of a separate DC current sensor exclusively disposed on the protective conductor, and the DC stray current being computed by forming differences of the differential current registered by the differential-current transformer and of the protective-conductor current registered by the separate DC current transformer.

In this third alternative solution, a differential-current transformer installed according to the state of the art for identifying fault currents is presumed. This differential-current transformer registers all currents as differential currents whose circuits are not closed exclusively via the active conductors of the power supply installation, thus also the DC stray current in addition to the DC fault/leakage current.

The additionally installed, separate DC current sensor, in contrast, only registers the DC fault/leakage current as the absolute current (protective-conductor current).

By forming the difference of the differential current registered by the differential-current transformer and of the protective-conductor current registered by the DC current sensor, the DC stray current can be determined in a computing unit.

In this instance as well, the dynamic range of the differential-current transformer and of the separate DC current sensor has to be designed for the fault and leakage currents expected to be much larger, which becomes noticeable in a disadvantageous manner with respect to the first alternative solution.

In another embodiment, an exceedance of a settable DC stray-current threshold value is identified via the DC stray current and the exceedance is signaled.

If an exceedance of a DC stray-current threshold value is established in a computing unit, a signaling device signals a corrosion-endangering DC stray current has been identified, for example via a notification on site or notifications distributed via the interface.

In this context, the DC stray-current threshold is adjustable to the monitored critical installation, in particular to the conductibility of the electrolytic medium and the stray-current corrosion sensitivity of the installed metallic component via adjustment.

The corresponding method steps of the three alternative solutions are implemented with corresponding structural features in three electric circuit arrangements according to the invention.

Thus, the technical effects attained using the claimed methods and the thus resulting advantages pertain in equal manner to the electric circuit arrangements.

The claimed electric circuit arrangements consequently also pose three alternative solutions which each correspond to the claimed methods, but differ from each other and in particular from the state of the art in the arrangement and execution of the differential-current measuring technology.

In this context, the first alternative solution is characterized by a DC total differential-current sensor: the second solution is characterized by a switchable combined DC differential-current sensor having a switch device; and the third alternative solution is characterized by a separate DC current sensor in interaction with forming difference in a computing unit.

In order to be able to differentiate between a DC fault/leakage current and a corrosion-effective DC stray current, the wiring according to the invention of the DC current sensor technology is effectuated in deviation from and in contrast to the manner described in the state of the art. In particular by involving the protective conductor in the registration via a differential-current transformer would even be described as faulty according to the state of the art.

BRIEF DESCRIPTION OF THE DRAWINGS

Further advantageous embodiments are derived from the following description and drawings, which describe preferred embodiments of the invention by means of examples.

DETAILED DESCRIPTION

Figure 1:
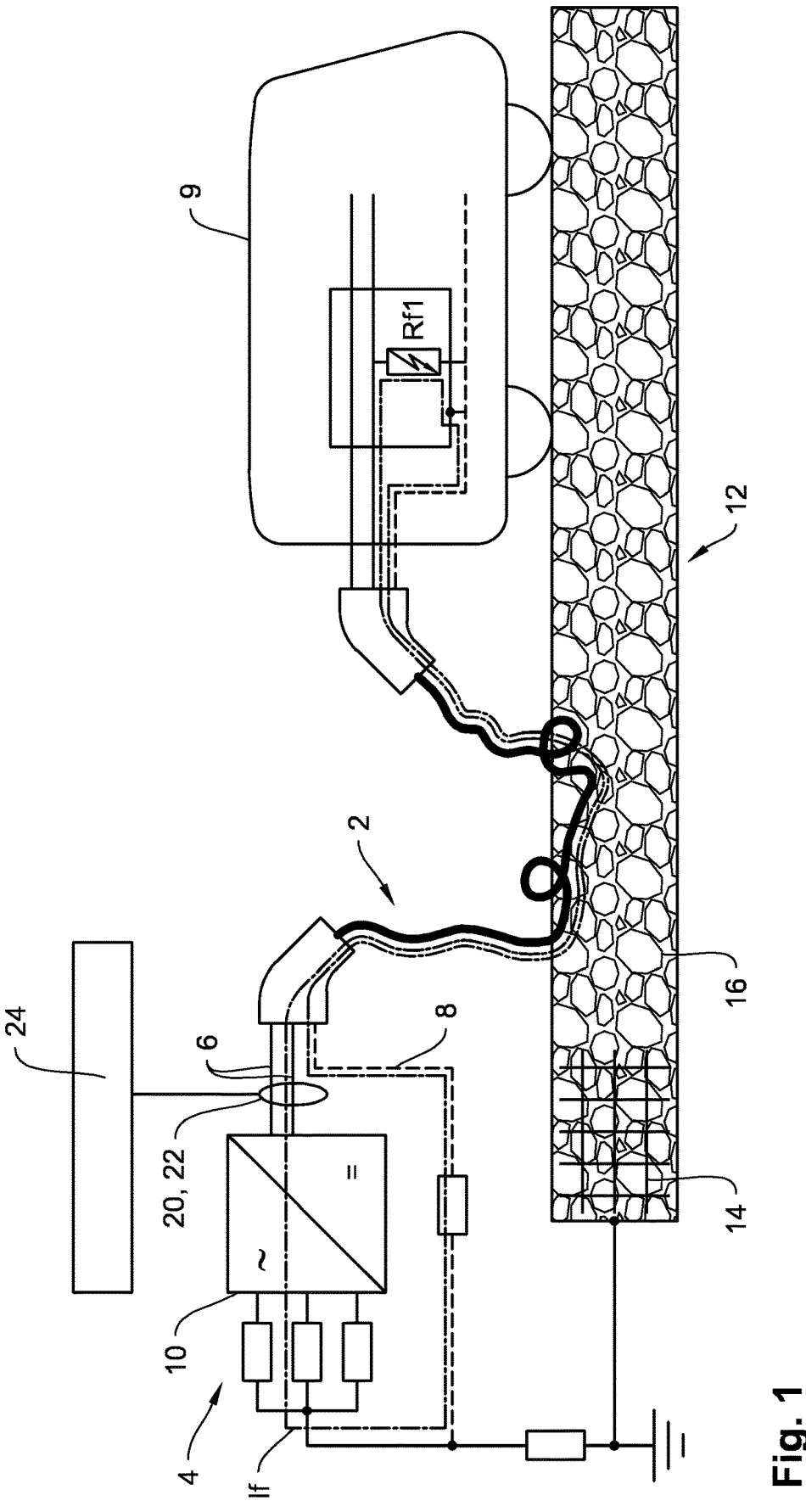
FIG. 1 shows a differential-current measurement for determining a fault current according to the state of the art.

FIG. 1 shows a differential-current measurement according to the state of the art for determining a DC fault/leakage current If in the example of a power supply system 4 deemed a critical installation 2 and having a charging station 10. Power supply system 4 is connected to an electric vehicle 9 via two active conductors 6 and protective conductor 8 on the DC side.

For monitoring and determining DC fault/leakage current If, a differential-current transformer 20 is provided via which (only) active conductors 6 are guided as stipulated by regulations, whereas protective conductor 8 is guided past differential-current transformer 20 on the outside.

Consequently, DC fault/leakage current If which flows in the electric vehicle via an insulation fault Rf1 to conductible parts connected to protective conductor 8 (fault to frame) is registered. (a DC stray current (FIG. 2) is not observed in FIG. 1)

Figure 2:
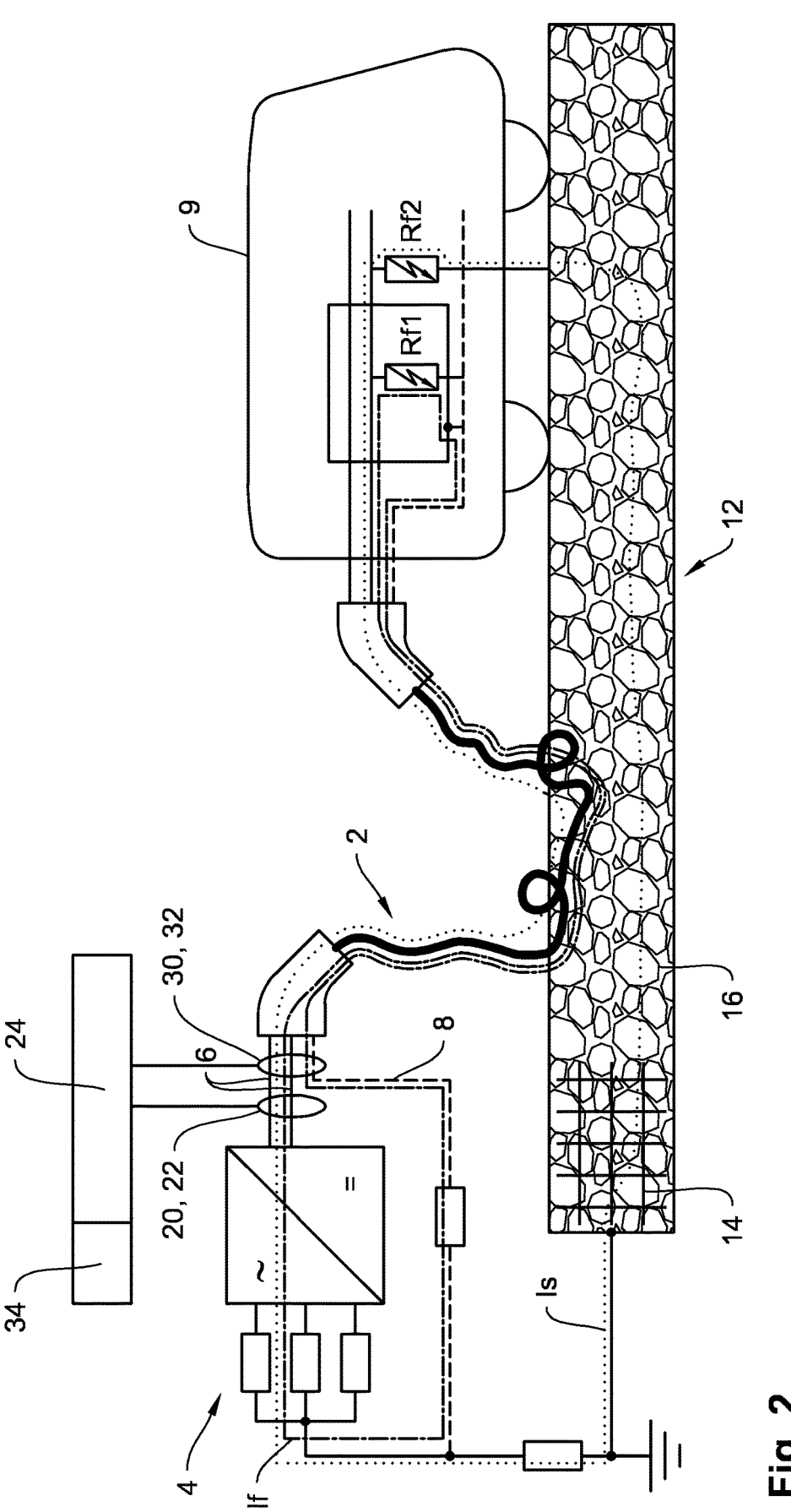
FIG. 2 shows a DC total differential-current measurement according to the invention.

In a first alternative solution, a DC total differential-current measurement according to the invention in the case of a possible DC stray current Is is shown in FIG. 2, DC stray current Is leaking in the electric vehicle via an electrolytic medium 16 (ferroconcrete) of a building 12 (parking facility), caused by an insulation fault Rf2.

Additionally to differential-current transformer 20 installed as per regulation as a fault-protection measure, a DC total differential-current sensor 30 preferably designed as a toroidal core transformer is connected in such a manner that the currents of all active conductors 6 and the current flowing in protective conductor 8 are registered jointly as total differential current 32.

Since protective conductor 8 is measured along with active conductors 6 using DC total differential-current sensor 30, DC fault/leakage current If cancels itself out, meaning only DC stray current Is remains as total differential current 32 and can be evaluated in a computing 24 regarding the exceedance of a settable DC stray-current threshold.

Consequently, only corrosion-effective stray current Is caused by insulation fault Rf2 is registered, stray current Is flowing in electric vehicle 9 past electrically conductive parts connected to protective conductor 8 directly via electrolytic ferroconcrete foundation 16 of parking facility 12.

In differential-current transformer 20 connected as stipulated by regulations for fault current measuring, however, DC stray current Is flowing via electrolytic ferroconcrete 16 is registered in addition to DC fault/leakage current If, though it cannot be distinguished from DC fault/leakage current If or be resolved for measurement reasons since DC stray current Is to be presumed smaller by a factor of at least 10 than DC fault/leakage current If in the charging current application described here.

Figure 3:
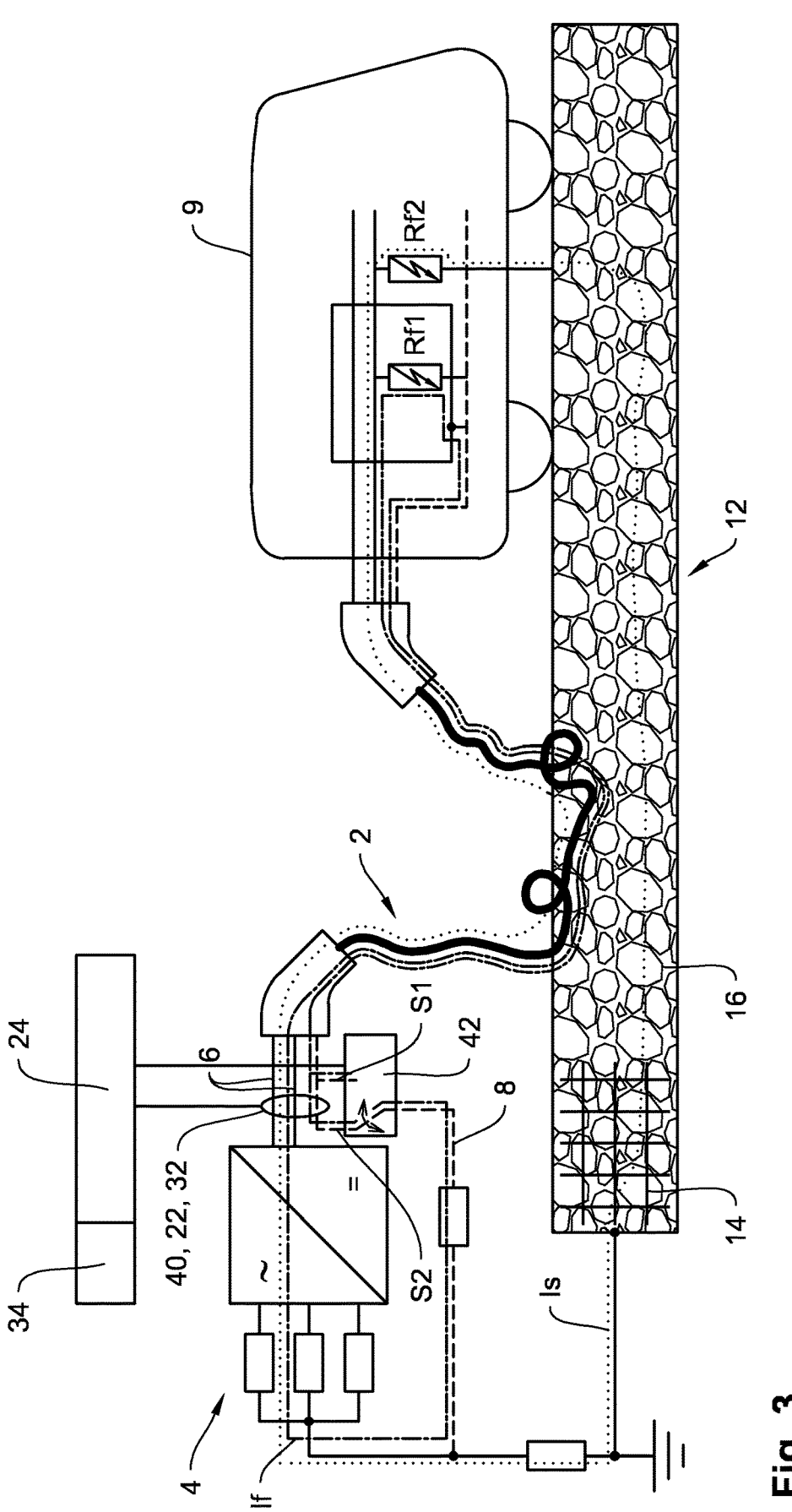
FIG. 3 shows a combined DC differential-current measurement according to the invention.

FIG. 3 shows a combined DC differential-current measurement according to the invention in a second alternative solution, having a combined DC differential-current sensor 40 which is preferably configured as a toroidal core transformer and is designed to be switchable by means of a switching device 42.

As a function of switch settings S1, S2, either only active conductors 6 (switch setting S1) or active conductors 6 and protective conductor 8 (switch setting S2 are guided via combined DC differential-current sensor 40.

In switch setting S1, combined DC differential-current sensor 40 is effective as a differential-current transformer 20 (FIG. 1) which registers the sum of all currents caused by insulation faults Rf1 and Rf2 as differential current 22.

In switch setting S2, only DC stray current Is is registered as total differential current 32 in function of DC total differential-current sensor 30 (FIG. 2).

Since switch device 42 switches protective conductor 8, this solution can prove to be normatively critical. Switch device 42 has to switch protective conductor 8 without interruption: requirements made to the low impedance of the protective-conductor loop impedance must not be exceeded at any point and the shut-off time of an overcurrent protective device must not be negatively impacted by the properties of switch device 42.

Figure 4:
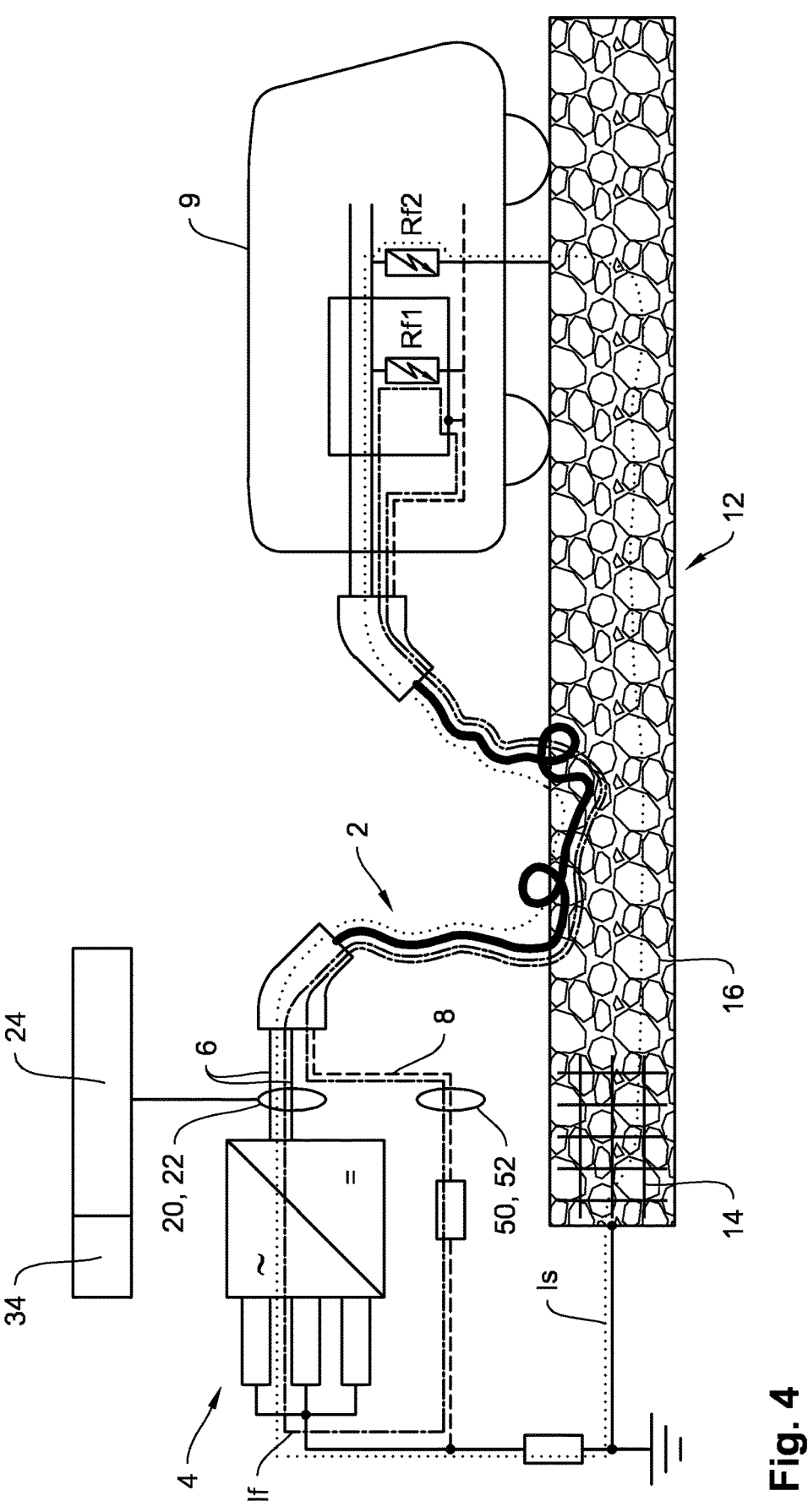
FIG. 4 shows a separate DC current measurement according to the invention.

FIG. 4 shows a separate DC current measurement in a third alternative solution, having a separate DC current sensor 50, preferably configured as a toroidal core transformer.

DC current sensor 50 encircles only protective conductor 8 and thus registers protective-conductor current 52 which is caused by insulation fault Rf1 and corresponds to DC fault/leakage current If.

Differential-current transformer 20 registers—in the manner installed only via active conductors 6 as stipulated by regulations—differential current 20 which corresponds to the sum of all currents caused by insulation faults Rf1 and Rf2, i.e., DC fault/leakage current If and DC stray current Is.

By forming the differences of differential current 20 and protective-conductor current 52, corrosion-effective DC stray current Is is computed in computing 24.

An exceedance of a settable DC stray-current threshold via DC stray current Is is identified in computing unit 24 and signaled by a signaling device 34.

The invention claimed is:

1. A method for protecting metal components (14) in an electrolytic medium (16) from corrosion as a consequence of a DC stray current (Is) from a power supply system (4), the method comprising:
   jointly registering the DC stray current (Is) as a total differential current (32) across a plurality of active conductors (6) together with the protective conductor (8) of the power supply system by a DC total-differential-current sensor (30).

2. The method according to claim 1, further comprising registering the DC stray current (Is) in a highly sensitive manner at a resolution of less than 1 mA.

3. A method for protecting metallic components (14) in an electrolytic medium (16) from corrosion as a consequence of a DC stray current (Is) from a power supply system (4), that the method comprising:

configuring a combined DC differential-current sensor (40) so as to be switchable by means of switching device (42);

detecting a differential current being across all active conductors (6) of the power supply system (4) in a first switch setting (S1); and registering the DC differential current (Is) as a total differential current across all active conductors (6) and the protective conductor (8) of the power supply system (4) in a second switch setting (S2).

4. A method for protecting metallic components (14) in an electrolytic medium (16) from corrosion as a consequence of a DC stray current (Is) from a power supply system (4), the method comprising:

registering a differential current across all active conductors (6) of the power supply system (4) by means of a differential-current transformer (20);

registering a protective-conductor current (52) using a separate DC current sensor (50) disposed exclusively at a protective conductor (8); and computing the DC stray current (Is) by forming differences of the differential current registered by the differential-current transformer (20) and of the protective-conductor current (52) registered by the separate DC current transformer (50).

5. The method according to claim 1, further comprising registering an exceedance of a settable DC stray-current threshold value via the DC stray current (Is) and signaling this exceedance.

6. An electric circuit arrangement for protecting metallic components (14) in an electrolytic medium (16) from corrosion as a consequence of a DC stray current (Is) from a power supply system (4), the electric circuit arrangement comprising:

a DC total differential-current sensor (30) which jointly registers the DC stray current (Is) as a total differential current (32) across a plurality of active conductors (6) together with the protective conductor (8) of the power supply system (4).

7. The electric circuit arrangement according to claim 6, wherein the DC total differential-current sensor (30) is configured to be highly sensitive for a resolution of less than 1 mA.

8. An electric circuit arrangement for protection of metallic components (14) in an electrolytic medium (16) from corrosion as a consequence of a DC stray current (Is) from a power supply system (4), the electric circuit arrangement comprising:

a combined DC differential-current sensor (40) which is configured to be switchable by means of a switching device (42), the combined DC differential-current sensor (40) registering a differential current across all active conductors (6) of the power supply system (4) in a first switch setting (S1) and the DC stray current (Is) being registered as a total differential current across all active conductors (6) and the protective conductor (8) of the power supply system (4) in a second switch setting (S2).

9. An electric circuit arrangement for protection of metallic components (14) in an electrolytic medium (16) from corrosion as a consequence of a DC stray current (Is) from a power supply system (4), the electric circuit arrangement having a differential-current transformer (20), which registers a differential current across all active conductors (6) of the power supply system (4), the electric circuit arrangement comprising:

a separate DC current sensor (50) which is disposed exclusively at the protective conductor (8) and registers a protective-conductor current (52), and having a computing unit (24), which is configured for computing the DC stray current (Is) by forming a difference of the differential current registered by the differential-current transformer (20) and of the protective-conductor current (52) registered by the separate DC current sensor (50).

10. The electric circuit arrangement according to claim 6, further comprising a computing unit (24), which is configured for identifying an exceedance of a settable stray-current threshold value by the DC stray current (Is), and a signaling device (34), which signals the exceedance.

11. The method according to claim 2, wherein an exceedance of a settable DC stray-current threshold value is registered via the DC stray current (Is), and wherein the exceedance of the settable DC stray-current threshold is indicated by a signal.

12. The method according to claim 3, wherein an exceedance of a settable DC stray-current threshold value is registered via the DC stray current (Is), and wherein the exceedance of the settable DC stray-current threshold is indicated by a signal.

13. The method according to claim 4, wherein an exceedance of a settable DC stray-current threshold value is registered via the DC stray current (Is), and wherein the exceedance of the settable DC stray-current threshold is indicated by a signal.

14. The electric circuit arrangement according to claim 7, further comprising:

a computing unit (24), which is configured for identifying an exceedance of a settable stray-current threshold value by the DC stray current (Is), and a signaling device (34), which signals the exceedance.

15. The electric circuit arrangement according to claim 8, further comprising:

a computing unit (24), which is configured for identifying an exceedance of a settable stray-current threshold value by the DC stray current (Is), and a signaling device (34), which signals the exceedance.

16. The electric circuit arrangement according to claim 9, further comprising:

a computing unit (24), which is configured for identifying an exceedance of a settable stray-current threshold value by the DC stray current (Is), and a signaling device (34), which signals the exceedance.

* * * * *